United States Patent
Kwon

(10) Patent No.: US 10,446,891 B2
(45) Date of Patent: Oct. 15, 2019

(54) SUBMODULE AND BATTERY MODULE HAVING THE SAME

(71) Applicant: SK Innovation Co., Ltd., Seoul (KR)

(72) Inventor: O Sung Kwon, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 88 days.

(21) Appl. No.: 15/585,299

(22) Filed: May 3, 2017

(65) Prior Publication Data

US 2017/0331164 A1   Nov. 16, 2017

(30) Foreign Application Priority Data

May 11, 2016  (KR) .................. 10-2016-0057696

(51) Int. Cl.
| | |
|---|---|
| *H01M 10/6551* | (2014.01) |
| *H01M 10/613* | (2014.01) |
| *H01M 10/647* | (2014.01) |
| *H01M 2/20* | (2006.01) |
| *H01M 10/0525* | (2010.01) |
| *H01M 10/34* | (2006.01) |
| *H01M 2/10* | (2006.01) |
| *H01M 10/6555* | (2014.01) |
| *H01M 10/625* | (2014.01) |

(52) U.S. Cl.
CPC ..... *H01M 10/6551* (2015.04); *H01M 2/1077* (2013.01); *H01M 2/202* (2013.01); *H01M 2/206* (2013.01); *H01M 10/0525* (2013.01); *H01M 10/345* (2013.01); *H01M 10/613* (2015.04); *H01M 10/625* (2015.04); *H01M 10/647* (2015.04); *H01M 10/6555* (2015.04)

(58) Field of Classification Search
None
See application file for complete search history.

(56) References Cited

U.S. PATENT DOCUMENTS

2013/0224549 A1*  8/2013  Lee .................. H01M 10/5004
429/99

FOREIGN PATENT DOCUMENTS

| | | | |
|---|---|---|---|
| DE | 102008061755 A1 | 6/2010 | |
| EP | 2955780 A1 * | 12/2015 | .......... H01M 2/1077 |
| EP | 2955780 A1 | 12/2015 | |

(Continued)

OTHER PUBLICATIONS

Search Report for corresponding EPO application No. 17169658.9, dated Jun. 22, 2017 (10 pages).

*Primary Examiner* — Daniel S Gatewood
(74) *Attorney, Agent, or Firm* — Abelman, Frayne & Schwab; Charles Stein

(57) ABSTRACT

Disclosed are a submodule and a battery module having the same, the submodule being comprising a three or more odd numbers of cells, and including: a cell unit divided into one single cell and at least one double cell; a first cooling fin provided at a side of the single cell and bent in a thickness direction of the single cell; and a second cooling fin provided between two cells composing the double cell and bent in thickness directions of the two cells. The single cell is cooled by the first cooling fin in surface contact with an exposed surface of the single cell, and the double cell is cooled by the second cooling fin in surface contact with stacked surfaces of the two cells, whereby all cells can be equally cooled, and energy density of the submodule can be increased by using a minimum number of members.

13 Claims, 9 Drawing Sheets

(56) References Cited

FOREIGN PATENT DOCUMENTS

| EP | 3002804 A1 * | 4/2016 | ........ H01M 10/0525 |
|----|---|---|---|
| EP | 3002804 A1 | 4/2016 | |
| KR | 10-2014-0059357 A | 5/2014 | |
| WO | WO-2014196778 A1 * | 12/2014 | .......... H01M 2/1077 |

* cited by examiner

SUBMODULE AND BATTERY MODULE HAVING THE SAME

CROSS REFERENCE TO RELATED APPLICATION

The present application claims priority to Korean Patent Application No. 10-2016-0057696, filed May 11, 2016, the entire contents of which is incorporated herein for all purposes by this reference.

BACKGROUND OF THE INVENTION

Field of the Invention

The present invention relates generally to a submodule and a battery module having the same.

Description of the Related Art

In general, a secondary battery is a battery that can be repeatedly used through discharging in which chemical energy is converted into electrical energy and reverse charging. The secondary battery comprises an anode, a cathode, an electrolyte, and a separator, and discharges or charges electrical energy through a voltage difference between different anode and cathode materials.

The secondary battery is classified into a nickel-cadmium battery, a nickel-hydrogen battery, a lithium-metal battery, a lithium ion battery, a lithium-ion polymer battery, etc. according to the composition materials, and is classified into a cylindrical battery, a prismatic battery, and a pouch type battery, etc. according to external and internal structural characteristics of the battery.

Meanwhile, as the application field of secondary batteries diversifies, the secondary battery needs to be variously combined to provide power and capacity suitable for the characteristics of the product. For example, a middle- or large-sized device such as an electric vehicle or a hybrid vehicle requires a high-power and large-capacity secondary battery, thus a battery module in which a plurality of battery cells are electrically connected to each other is used. In order to meet a specific capacity or power requirement, a submodule in which an odd number of battery cells are connected in series or in parallel, and a battery module in which a plurality of such submodules are stacked and connected in series or in parallel are required.

In addition, since a plurality of battery cells are sequentially stacked to reduce size of a battery module used in a middle- or large-sized device, the battery module is required to have a structure capable of efficiently dissipating and cooling heat generated during charging and discharging. Cooling structures are divided into air cooling types and water cooling types. When cooling a battery cell by water cooling, it is important to cool each battery cell to the same level. Thus, even if each submodule has three or more odd number of cells such as three or five cells, etc., it is necessary to have a structure capable of cooling respective cells to the same level.

The foregoing is intended merely to aid in the understanding of the background of the present invention, and is not intended to mean that the present invention falls within the purview of the related art that is already known to those skilled in the art.

Documents of Related Art (Patent Document 1) Korean Application Publication No. 10-2014-0059357

SUMMARY OF THE INVENTION

Accordingly, the present invention has been made keeping in mind the above problems occurring in the related art, and the present invention is intended to propose a submodule and a battery module having the same, the submodule being comprising three or more odd numbers of cells and being capable of cooling each cell to the same level, wherein an outermost one cell is cooled by a first cooling fin and the other cells are cooled by a second cooling fin by being grouped by two cells, whereby the all cells composing the submodule can be equally cooled and energy density of the submodule can be increased by using only a minimum number of cooling members.

Further, the present invention is intended to propose a submodule and a battery module having the same, wherein the submodule is provided such that the three or more odd number of cells are connected to each other in parallel, and thus with only one type of standardized submodule, a battery module in which the three or more odd numbers of cells are connected to each other in parallel and being capable of cooling each cell to the same level can be provided, whereby production cost can be reduced and the assembling process can be simplified through simplification and common use of components.

In order to achieve the above object, according to one aspect of the present invention, there is provided a submodule for a battery module, the submodule including: a cell unit in which cells having a cell body and first and second battery tabs protrudingly extending from opposite sides of the cell body are stacked in a surface direction, the cell unit being divided into a single cell that comprises one cell, is stacked at an outermost side of the cell unit, and has an exposed surface, and a double cell that comprises two cells and is stacked in a direction opposite to the exposed surface of the single cell; a first cooling fin including a single cell heat transfer part being provided at a direction of the exposed surface of the single cell and being in surface contact with the exposed surface of the single cell, and a single cell heat dissipation part extending from a lower end of the single cell heat transfer part to be bent perpendicularly in a thickness direction of the single cell provided at a side of the single cell heat transfer part; and a second cooling fin including a double cell heat transfer part being provided between the two cells composing the double cell and being in surface contact with stacked surfaces of the two cells, and a double cell heat dissipation part extending from a lower end of the double cell heat transfer part to be bent perpendicularly in thickness directions of the two cells provided at opposite sides of the double cell heat transfer part, and provided separately from the single cell heat dissipation part.

Further, the cell unit may include a plurality of double cells that are stacked sequentially in the direction opposite to the exposed surface of the single cell.

Further, the cell unit may further include an elastic absorption pad that is provided between the single cell and the double cell and is in surface contact with stacked surfaces of the single cell and the double cell.

Further, the cell unit may further include an elastic absorption pad that is provided between the double cells and is in surface contact with stacked surfaces of the double cells.

Further, an area of the single cell heat dissipation part may correspond to a cross-sectional area of the single cell, provided at the side of the single cell heat transfer part, in a thickness direction, and an area of the double cell heat dissipation part may correspond to cross-sectional areas of the two cells, provided at the opposite sides of the double cell heat transfer part, in a thickness direction.

Further, the area of the single cell heat dissipation part corresponding to the cross-sectional area of the single cell in the thickness direction may be substantially the same as the area of the double cell heat dissipation part corresponding to the cross-sectional area of one of the two cells in the thickness direction.

Further, the single cell heat transfer part may be provided with a thermal pad at a surface thereof being in surface contact with the single cell, or the double cell heat transfer part may be provided with a thermal pad at each of opposite surfaces thereof being in surface contact with the two cells, such that the thermal pad is in surface contact with the single cell or the two cells, the thermal pad having higher conductivity than the single cell heat transfer part or the double cell heat transfer part.

Further, the submodule further includes: a casing open at front and rear sides thereof, having the cell unit therein, and provided at opposite outer surfaces thereof with a tab coupling part to which first and second internal busbars are coupled such that the first and second internal busbars are electrically connected to the first and second battery tabs of the cell unit contained in the casing, wherein the single cell heat dissipation part and the double cell heat dissipation part may be provided at a lower portion of the casing and may be exposed to an outside of the casing.

Further, the first battery tabs of the single cell and the double cell may have the same polarity, and may be tightly coupled to the first internal busbar coupled to a first side of the casing, and the second battery tabs of the single cell and the double cell may have the same polarity different from that of the first battery tabs, and may be tightly coupled to the second internal busbar coupled to a second side of the casing.

According to another aspect of the present invention, there is provided a battery module including: a stack in which a plurality of submodules are stacked in front and rear directions, each of the submodules including: a cell unit in which cells having a cell body and first and second battery tabs protrudingly extending from opposite sides of the cell body are stacked in a surface direction, the cell unit being divided into a single cell that comprises one cell, is stacked at an outermost side of the cell unit, and has an exposed surface, and a double cell that comprises two cells and is stacked in a direction opposite to the exposed surface of the single cell; a first cooling fin including a single cell heat transfer part being provided at a direction of the exposed surface of the single cell and being in surface contact with the exposed surface of the single cell, and a single cell heat dissipation part extending from a lower end of the single cell heat transfer part to be bent perpendicularly in a thickness direction of the single cell provided at a side of the single cell heat transfer part; a second cooling fin including a double cell heat transfer part being provided between the two cells composing the double cell and being in surface contact with stacked surfaces of the two cells, and a double cell heat dissipation part extending from a lower end of the double cell heat transfer part to be bent perpendicularly in thickness directions of the two cells provided at opposite sides of the double cell heat transfer part, and provided separately from the single cell heat dissipation part; and a casing open at front and rear sides thereof, having the cell unit therein, and provided at opposite outer surfaces thereof with a tab coupling part to which first and second internal busbars are coupled such that the first and second internal busbars are electrically connected to the first and second battery tabs of the cell unit contained in the casing, wherein the single cell heat dissipation part and the double cell heat dissipation part are provided at a lower portion of the casing and are exposed to an outside of the casing, wherein the submodules are stacked in alternate directions such that a single cell of a first submodule faces a single cell of a second submodule, and a first cooling fin of the first submodule and a first cooling fin of the second submodule are in direct surface contact with each other; a connecting busbar assembly coupled to opposite sides of the stack, and having an internal connecting busbar provided in a direction toward the stack and alternately and electrically connecting a first internal busbar and a second internal busbar between the submodules to each other; and a cover part having a module cover covering front and rear surfaces of the stack in a stacked direction, a busbar cover covering the connecting busbar assembly coupled to the opposite sides of the stack, and an upper cover covering an upper portion of the stack.

Further, the stack may further include an elastic absorption pad provided between a double cell of the first submodule and a double cell of the second submodule stacked to face the double cell of the first submodule, such that the absorption pad is in surface contact with the double cells of the first and second submodules.

Further, the first internal busbar of the first submodule and the second internal busbar of the second submodule that are electrically connected to each other by the internal connecting busbar may have different polarities from each other, such that the plurality of submodules are connected to each other in series.

Further, the connecting busbar assembly may further include: a first external terminal electrically connected to the first internal busbar of a first outermost submodule stacked at a first outermost side of the stack, and bent toward a top of a casing of the first submodule such that the first external terminal is exposed to an outside of the upper cover; and a second external terminal electrically connected to the second internal busbar of a second outermost submodule stacked at a second outermost side of the stack, and bent toward a top of a casing of the second submodule such that the second external terminal is exposed to the outside of the upper cover.

According to an embodiment of the present invention, the single cell is cooled by the first cooling fin being in surface contact with a part of the exposed surface thereof, and the double cell is cooled by the second cooling fin being in surface contact with stacked surfaces of two cells composing the double cell. Thus, the entire cell can be cooled by only using the minimum number of members, thereby improving energy density within the limited space of the submodule.

Further, heat of the single cell is dissipated through the single cell heat dissipation part being bent perpendicularly in the thickness direction of the single cell, while heat of the double cell that generates twice the heat of the single cell is dissipated through the double cell heat dissipation part having twice the cooling performance of the single cell heat dissipation part. Thus, the single cell and the double cell can be cooled to the same level.

Further, the elastic absorption pad being in surface contact with stacked surfaces of the single cell and the double cell is provided between the single cell and the double cell. Thus, even when thicknesses of the single cell and the double cell are changed due to heat generation, thickness of the entire submodule may not be changed, and thus durability of the submodule can be improved.

Further, the thermal pad having high thermal conductivity is provided on the surface of the single cell heat transfer part or each of opposite surfaces of the double cell heat transfer part. Thus, cooling performance of the first and second cooling fins can be improved.

Further, the single cell and the double cell are connected to each other in parallel, so that one type of submodule can compose the battery module in which an odd number of cells, such as three and the like, are connected to each other in parallel and each cell can be cooled to the same level. Thus, assembly process can be simplified and reliability of assembly can be improved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
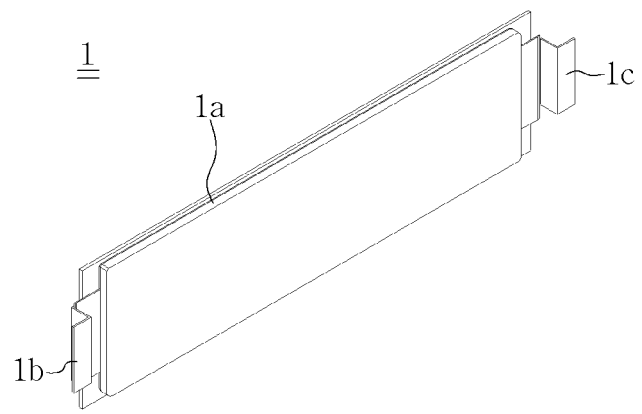
FIG. 1 is a perspective view showing a cell according to an embodiment of the present invention.

The above and other objects, features and advantages of the present invention will be more clearly understood from the following detailed description taken in conjunction with the accompanying drawings. Reference now should be made to the drawings, in which the same reference numerals are used throughout the different drawings to designate the same or similar components. Further, it will be understood that, although the terms "first", "second", "one submodule", "another submodule", etc. may be used herein to describe various elements, these elements should not be limited by these terms. Further, when it is determined that the detailed description of the known art related to the present invention might obscure the gist of the present invention, the detailed description thereof will be omitted.

Hereinbelow, exemplary embodiments of the present invention will be described in detail with reference to the accompanying drawings.

Figure 2A:
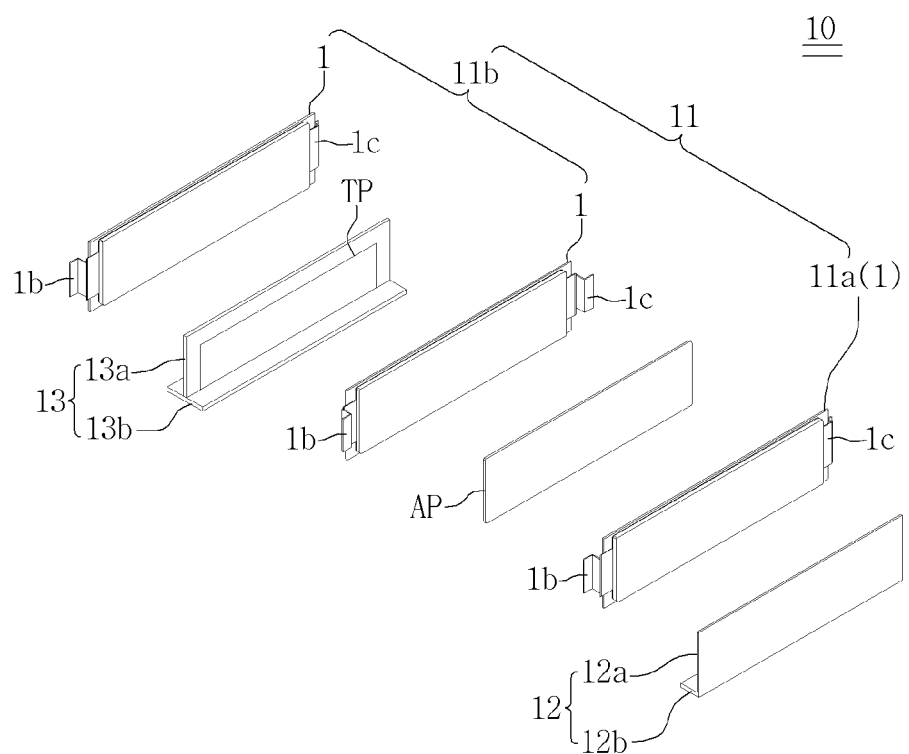
FIGS. 2a and 2b are an exploded perspective view and a cross-sectional view showing a submodule including a cell unit, a first cooling fin, and a second cooling fin according to the embodiment of the present invention.
Figure 2B:
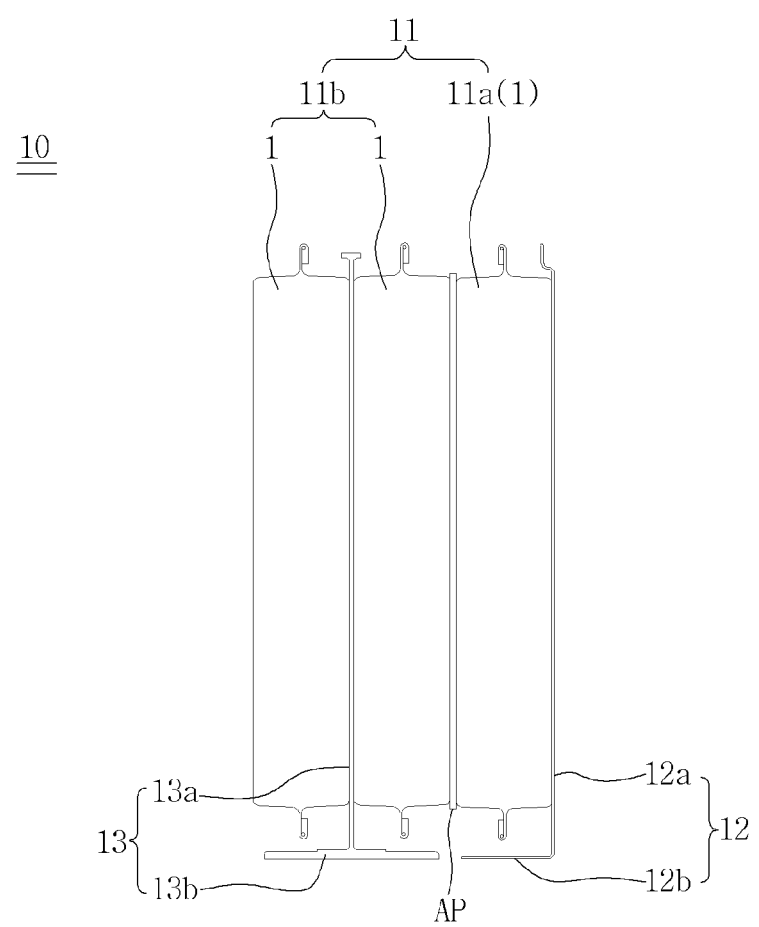

FIG. 1 is a perspective view showing a cell 1 according to an embodiment of the present invention, and FIGS. 2a and 2b are an exploded perspective view and a cross-sectional view showing a submodule 10 including a cell unit 11, a first cooling fin 12, and a second cooling fin 13 according to the embodiment of the present invention.

The submodule 10 according to the embodiment of the present invention includes: the cell unit 11 in which a cell 1 having a cell body and first and second battery tabs 1b and 1c protrudingly extending from opposite sides of the cell body is stacked in a surface direction, the cell unit being divided into a single cell 11a that comprises one cell 1, is stacked at an outermost side of the cell unit 11, and has an exposed surface, and a double cell 11b that comprises two cells 1 and is stacked in a direction opposite to the exposed surface of the single cell 11a; a first cooling fin 12 having a heat transfer part 12a being provided at a direction of the exposed surface of the single cell 11a and being in surface contact with the exposed surface of the single cell 11a, and a single cell heat dissipation part 12b extending from a lower end of the single cell heat transfer part 12a to be bent perpendicularly in a thickness direction of the single cell 11a provided at a side of the single cell heat transfer part 12a; and a second cooling fin 13 having a double cell heat transfer part 13a being provided between the two cells 1 composing the double cell 11b and being in surface contact with stacked surfaces of the two cells 1, and a double cell heat dissipation part 13b extending from a lower end of the double cell heat transfer part 13a to be bent perpendicularly in thickness directions of the two cells 1 provided at opposite sides of the double cell heat transfer part 13a, and provided separately from the single cell heat dissipation part 12b. Accordingly, the single cell 11a is cooled by the first cooling fin 12 being in surface contact with the exposed surface thereof and being bent perpendicularly in the thickness direction of the single cell 11a, while the double cell 11b is cooled by the second cooling fin 13 being in surface contact with the stacked surfaces of the two cells 1 composing the double cell 11b and being bent perpendicularly in the thickness directions of the two cells 1. Thus, it is possible to cool all the cells 1 included in the submodule 10 to the same level.

In the submodule 10 according to the embodiment of the present invention, the cell 1 may be a rechargeable secondary battery, for example, a lithium secondary battery or a nickel-hydrogen secondary battery, without being limited thereto. However, it is obvious that various types of rechargeable secondary batteries can be selected. Further, in order to reduce sizes of the submodule 10 in which the cells 1 are stacked and a battery module 20 that will be described later, the cell 1 may be provided as a secondary battery having a small thickness, a wide width, and a long length, for example, a pouch-type secondary battery in which an electrode assembly is contained in a laminate sheet including a resin layer and a metal layer, and battery tabs are exposed. Meanwhile, the electrode assembly includes a positive electrode, a negative electrode, and a separator, and corresponds to a known technology in the prior art, so that detailed description and illustration are omitted.

Referring to FIG. 1, the cell 1 includes the cell body 1a having the electrode assembly therein and the first and second battery tabs 1b and 1c protrudingly extending from opposite sides of the cell body 1a. Although the first and second battery tabs 1b and 1c are described as protruding from opposite sides of the cell body 1a for convenience of explanation, the first and second battery tabs 1b and 1c may be provided on an upper portion of the cell body 1a, and the arrangement structure of the first and second battery tabs 1b and 1c is not limited thereto.

As shown in FIG. 2a, a plurality of cells 1 are stacked in a surface direction to compose the cell unit 11. Here, the number of cells 1 composing the cell unit 11 may be three or more odd numbers of cells 1 such as three, five, seven, etc. However, in the present invention, the number of cells 1 will be described based on three. In the case that the number of cells 1 composing the cell unit 11 is an odd number such as three, when each of the cells 1 is provided with the cooling fin at a side thereof such that the each of cells 1 is individually cooled, there is a problem in that the number of parts related to cooling is increased and thus a more complicated manufacturing process is required, and a space occupied by the cooling members is enlarged in the limited space of the submodule 10 and thus energy density of the submodule 10 is lowered. On the other hand, when two cells 1 are grouped to be cooled together, one cell 1 is left so there is a problem in that the odd number of cells 1 such as three cannot be cooled uniformly. Accordingly, in the submodule 10 according to the embodiment of the present invention, since the three cells 1 are cooled by being divided into the single cell 11a and the double cell 11b, a method of dividing the odd number of cells 1 such as three into the single cell 11a and the double cell 11b will be described.

When the cell unit 11 comprises three cells 1, the cell unit 11 is divided into the single cell 11a that comprises one cell 1, is stacked at the outermost side of the cell unit 11, and has an exposed surface, and the double cell 11b that is stacked in the direction opposite to the exposed surface of the single cell 11a. In other words, the three cells 1 may be divided into one single cell 11a and one double cell 11b. On the other hand, when the cell unit 11 comprises five cells 1, one cell 1 stacked on the outermost side of the cell unit 11 and having an exposed surface may be the single cell 11a, four cells 1 stacked in a direction opposite to the exposed surface of the single cell 11a may be grouped into two double cells 11b sequentially. In other words, five cells 1 may be divided into one single cell 11a and two double cells 11b. When the cell unit 11 comprises seven cells 1, the cell unit 11 is divided into one single cell 11a and three double cells 11b. By generalizing this formula, the cell unit 11 includes one single cell 11a and at least one double cell 11b, wherein the at least one double cell 11b may be sequentially stacked in the direction opposite to the exposed surface of the single cell 11a.

Further, as shown in FIG. 2a, in order to buffer the variation of thicknesses of the single cell 11a and the double cell 11b as the cell unit 11 generates heat due to the charging and discharging of the single cell 11a and the double cell 11b, the cell unit 11 may further include an elastic absorption pad AP that is provided between the single cell 11a and the double cell 11b and is in surface contact with stacked surfaces of the single cell 11a and the double cell 11b. In addition, when the cell unit 11 comprises five cells 1, seven cells 1, and the like, and the number of double cells 11b is plural, the cell unit 11 may further include the elastic absorption pad AP that is provided between the double cells 11b is in surface contact with stacked surfaces of the double cells 11b. Accordingly, even when thicknesses of the single cell 11a and the double cell 11b are changed, thickness of the cell unit 11 is not changed, whereby the submodule 10 can have improved durability. Moreover, the elastic absorption pad AP may have adhesiveness on both sides thereof, and thus may perform a function of fixing the single cell 11a and the double cell 11b to a certain level.

Meanwhile, the single cell 11a and the double cell 11b included in the cell unit 11 may be connected to each other in series or in parallel, which will be described herein based on a parallel connection. In the case of the parallel connection, first battery tabs 1b provided at first sides of the single cell 11a and the double cell 11b are electrically connected to each other with the same polarity, while the second battery tabs 1c provided at second sides of the single cell 11a and the double cell 11b are electrically connected to each other with the same polarity, but which is different from that of the first battery tabs 1b. As such, when the single cell 11a and the double cell 11b are connected to each other in parallel, the submodule 10 has a structure in which the odd number of cells 1 such as three and the like are connected to each other in parallel, whereby a battery module 20 to be described later may be configured with one submodule such that the odd number of cells 1 are connected to each other in parallel in the battery module 20.

Referring to FIGS. 2a and 2b, the first cooling fin 12 is a member that dissipates heat generated in the single cell 11a, and includes the single cell heat transfer part 12a being provided at a direction of the exposed surface of the single cell 11a and being in surface contact with the exposed surface of the single cell 11a, and the single cell heat dissipation part 12b extending from the lower end of the single cell heat transfer part 12a to be bent perpendicularly in the thickness direction of the single cell 11a, which is a direction of the side of the single cell heat transfer part 12a. In other words, the first cooling fin 12 is in surface contact with the exposed surface of the single cell 11a, and bent perpendicularly in the thickness direction the single cell 11a provided at the side of the single cell heat transfer part 12a, thereby having a L-shaped cross section. Here, the single cell heat dissipation part 12b is in surface contact with a heat sink (not shown) at a bottom surface thereof, whereby the first cooling fin 12 can dissipate heat generated in the single cell 11a into the heat sink. Meanwhile, the first cooling fin 12 may be made of aluminum (Al) having high thermal conductivity, and may be manufactured by press working, but the material and manufacturing method of the first cooling fin 12 are not limited thereto.

The second cooling fin 13 is a member that dissipates heat generated in the double cell 11b, and includes the double cell heat transfer part 13a being provided between two cells 1 composing the double cell 11b and being in surface contact with stacked surfaces of the two cells 1, and the double cell heat dissipation part 13b extending from the lower end of the double cell heat transfer part 13a to be bent perpendicularly in the thickness directions of the two cells 1 provided at opposite sides of the double cell heat transfer part 13a, thereby having an inverse T-shaped cross section. Here, the double cell heat dissipation part 13b is provided separately from the single cell heat dissipation part 12b, such that no direct heat conduction occurs therebetween, and is in surface contact with a heat sink (not shown) at a bottom surface thereof, whereby the second cooling fin 13 can dissipate heat generated in the double cell 11b into the heat sink. In addition, the second cooling fin 13 may be made of aluminum (Al) having high thermal conductivity, and may be manufactured by an extrusion method, but the material and manufacturing method of the second cooling fin 13 are not limited thereto.

As described above, in the single cell 11a, heat is dissipated through the single cell heat dissipation part 12b perpendicularly bent in the thickness direction of the single cell 11a. In the double cell 11b, which generates twice as much heat as the single cell 11a, heat is dissipated through the double cell heat dissipation part 13b perpendicularly bent in the thickness directions of two cells 1 composing the double cell 11b and having twice the cooling performance of the single cell heat dissipation part 12b. Thus, the single cell 11a and the double cell 11b can be cooled to the same level. Meanwhile, an area of the single cell heat dissipation part 12b corresponds to a cross-sectional area of the single cell 11a in a thickness direction, and an area of the double cell heat dissipation part 13b corresponds to cross-sectional areas of two cells 1, composing the double cell 11b, in a thickness direction. Thus, areas of the single cell heat dissipation part 12b and the double cell heat dissipation part 13b that are in surface contact with heat sinks can be maximized within a limited area, whereby cooling efficiency can be further increased. Moreover, the area of the single cell heat dissipation part 12b may be substantially the same as that of the double cell heat dissipation part 13b corresponding to the cross-sectional area of one of the two cells 1, composing the double cell 11b, in the thickness direction. Accordingly, heat dissipated from the single cell heat dissipation part 12b is the same as heat dissipated from half of the double cell heat dissipation part 13b, and thus the single cell 11a and the double cell 11b can be cooled to the same level.

Meanwhile, the single cell heat transfer part 12a is provided with a thermal pad TP at a surface thereof being in surface contact with the single cell 11a, or the double cell heat transfer part 13a is provided with a thermal pad TP at each of opposite surfaces thereof being surface contact with two cells 1, the thermal pad TP having higher conductivity than the single cell heat transfer part 12a or the double cell heat transfer part 13a. Accordingly, since the thermal pad TP is in surface contact with the single cell 11a or the two cells 1 composing the double cell 11b, heat generated in the single cell 11a or the double cell 11b can be rapidly transferred to the single cell heat dissipation part 12b or the double cell heat dissipation part 13b, whereby cooling performance can be improved. In addition, the thermal pad TP may have adhesive properties on both sides thereof, and thus may also function to fix the single cell 11a and the double cell 11b.

Figure 3A:
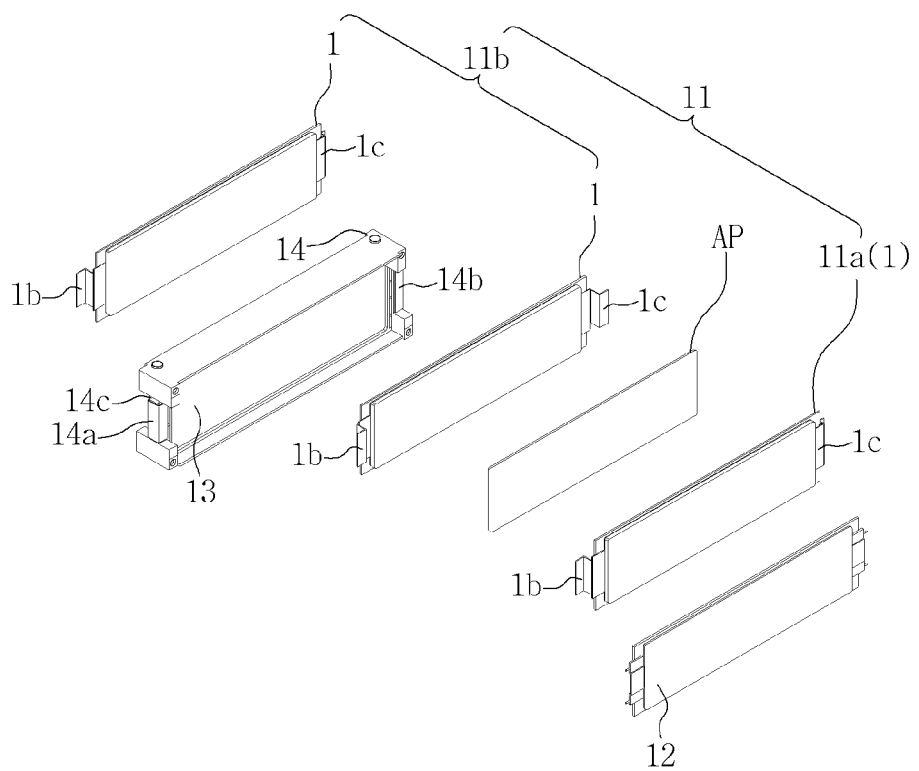
FIGS. 3a and 3b are an exploded perspective view and a cross-sectional view of the submodule further including a casing according to the embodiment of the present invention.
Figure 3B:
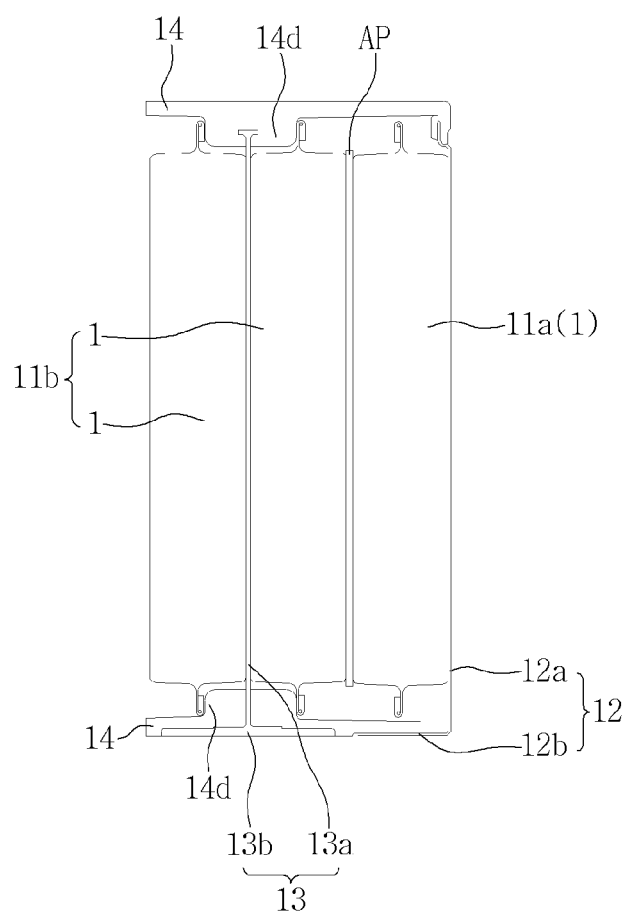
Figure 4A:
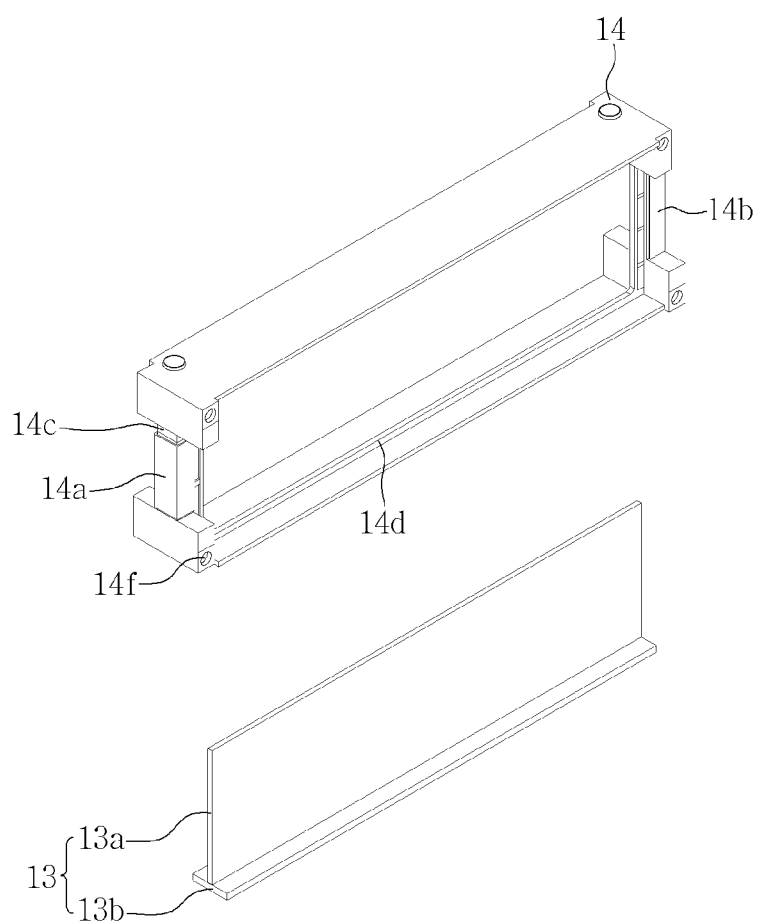
FIGS. 4a and 4b are perspective views showing a first example and a second example of the casing according to the embodiment of the present invention.
Figure 4B:
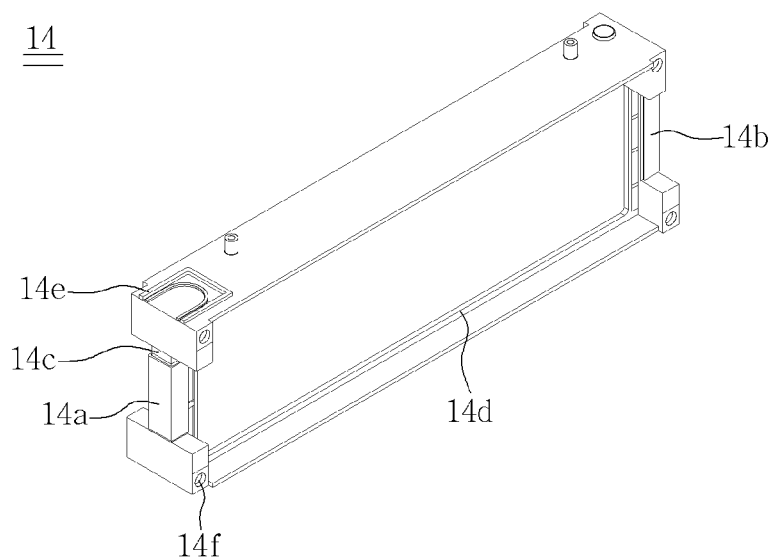

FIGS. 3a and 3b are an exploded perspective view and a cross-sectional view of a submodule 10 further including a casing 14 according to an embodiment of the present invention, and FIGS. 4a and 4b are perspective views showing a first example and a second example of the casing 14 according to the embodiment of the present invention. Hereinafter, the submodule 10 further including the casing 14 will be described based on the above description, and the description overlapping with the above description will be omitted.

As shown in FIG. 3a, the submodule 10 according to the above description may further include the casing 14, and as shown in FIG. 4a, the casing 14 is open at front and rear sides thereof, has the cell unit 11 therein, and is provided at opposite outer surfaces thereof with a tab coupling part 14c to which first and second internal busbars 14a and 14b are coupled such that the first and second internal busbars 14a and 14b are electrically connected to the first and second battery tabs 1b and 1c of the cell unit 11. The casing 14 has the cell unit 11 therein including an odd number of cells 1 such as three and the like, whereby the cell unit 11 can be stably fixed in the casing 14, and the submodule 10 can have improved mechanical rigidity.

Further, since all of the first and second battery tabs 1b and 1c of the cell unit 11 are electrically connected to the first and second internal busbars 14a and 14b coupled to the casing 14, reliability of the electrical connection can be further improved, wherein electrical connection between first internal busbars 14a and first battery tabs 1b of the cell unit 11 and between second internal busbars 14b and second battery tabs 1c of the cell unit 11 may be implemented by laser welding. As implemented by laser welding, working speed and reliability of assembly can be improved as compared with the case of being implemented by resistance welding or ultrasonic welding. Meanwhile, the single cell 11a and the double cell 11b of the cell unit 11 contained in the casing 14 may be connected to each other in series or in parallel. In parallel connection, the first battery tabs 1b of the single cell 11a and the double cell 11b may have the same polarity and may be tightly coupled to the first internal busbar 14a coupled to a first side of the casing 14, while the second battery tabs 1c of the single cell 11a and the double cell 11b may have the same polarity different from that of the first battery tabs 1b and may be tightly coupled to the second internal busbar 14b coupled to a second side of the casing 14.

Further, when the submodule 10 further includes the casing 14, as shown in FIG. 3b, the single cell heat dissipation part 12b of the first cooling fin 12 and the double cell heat dissipation part 13b of the second cooling fin 13 are provided at a lower portion of the casing 14 and are exposed to the outside of the casing 14, thereby being in contact with a heat sink (not shown) provided at a lower end of the casing 14. The coupling relationship between the first cooling fin 12 and the casing 14 will be described in detail. The single cell heat transfer part 12a is in surface contact with the exposed surface of the single cell 11a provided in a forward direction of a backward direction of the casing 14, and the single cell heat dissipation part 12b extending from the lower end of the single cell heat transfer part 12a is bent toward the lower portion of the casing 14. Accordingly, the first cooling fin 12 may be entirely coupled with the casing such that the cooling fin 12 covers the front and rear sides of the casing 14, wherein the first cooling fin 12 and the casing 14 may be coupled to each other by laser welding. In the coupling relationship between the second cooling fin 13 and the casing 14, as shown in FIG. 4a, the double cell heat transfer part 13a is inserted from the lower portion into an upper portion of the casing 14 to block the open front and rear sides of the casing 14, and the double cell heat dissipation part 13b extending from the lower end of the double cell heat transfer part 13a is in close contact with a lower surface of the casing 14, in such a manner that the second cooling fin 13 can be coupled to the casing 14. The casing 14 coupled with the second cooling fin 13 may be manufactured by an injection molding method. Further, the casing 14 may be provided with a fixing protrusion 14d inwardly formed on upper and lower surfaces of the casing 14 such that the second cooling fin 13 is stably coupled to the casing. The fixing protrusion 14d may be formed continuously or intermittently from the first side to the second side of the casing 14.

As shown in FIG. 4a, the casing 14 may be open at the front and rear sides thereof, and may be provided at opposite outer surfaces thereof with the tab coupling part 14c to which the first and second internal busbars 14a and 14b are coupled. The submodule 10 including the casing 14 may be stacked at a center of the battery module 20, rather than an outside of the battery module 20 that will be described later. Further, as shown in FIG. 4b, the casing 14, which is open at the front and rear sides thereof and is provided at opposite outer surfaces thereof with the tab coupling part 14c to which the first and second internal busbars 14a and 14b are coupled, may be provided at a first upper portion thereof with an external terminal insertion part 14e to which an external terminal (see FIG. 6) is coupled. The submodule 10 including the casing 14 may be stacked at the outside of the battery module 20 that will be described later.

Figure 5A:
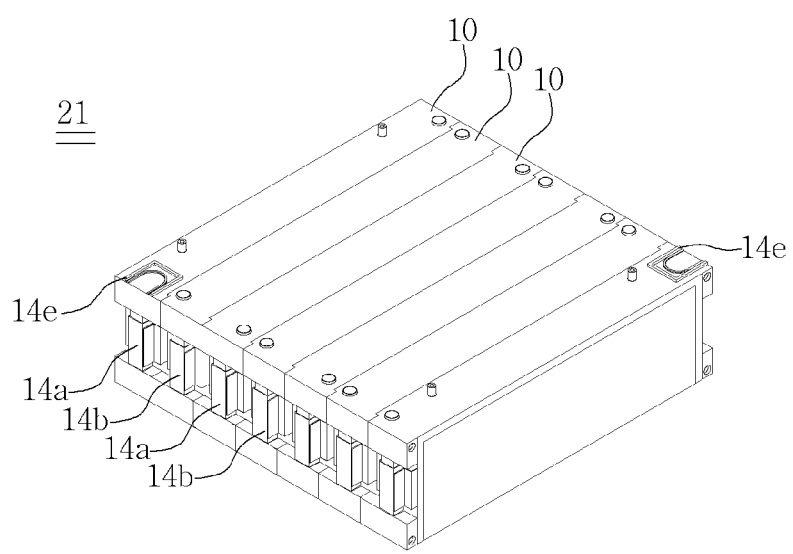
FIGS. 5a and 5b are a perspective view and a cross-sectional view showing a stack of a battery module according to an embodiment of the present invention.
Figure 5B:
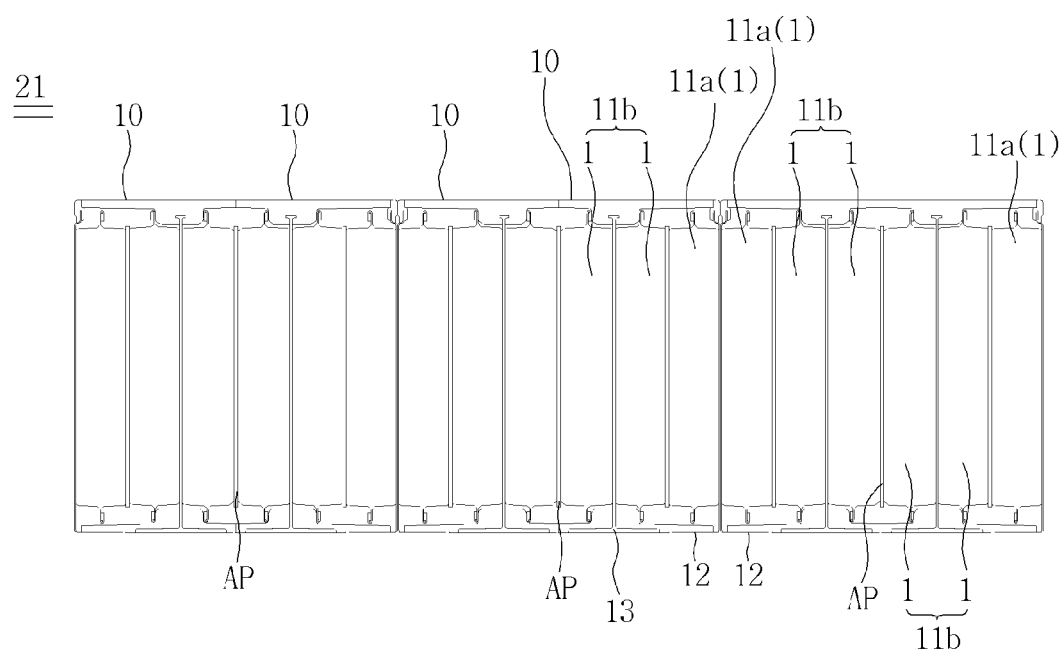
Figure 6:
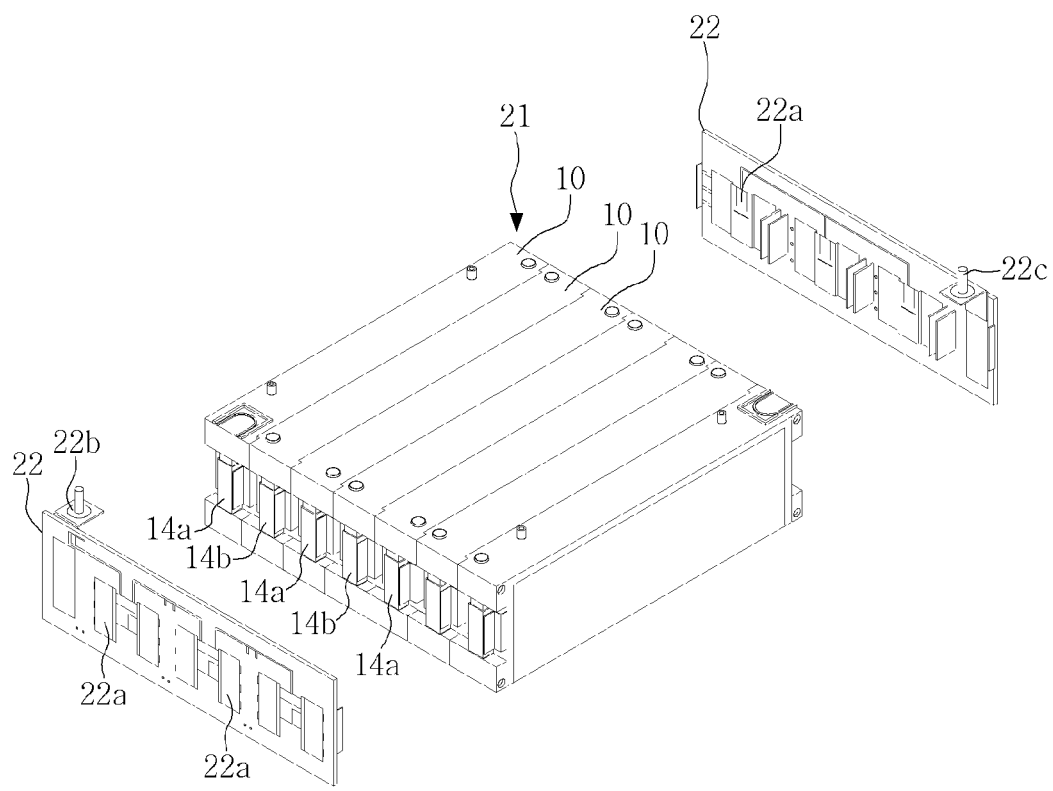
FIG. 6 is an exploded perspective view showing a coupling relationship between the stack and a connecting busbar assembly of the battery module according to the embodiment of the present invention.
Figure 7:
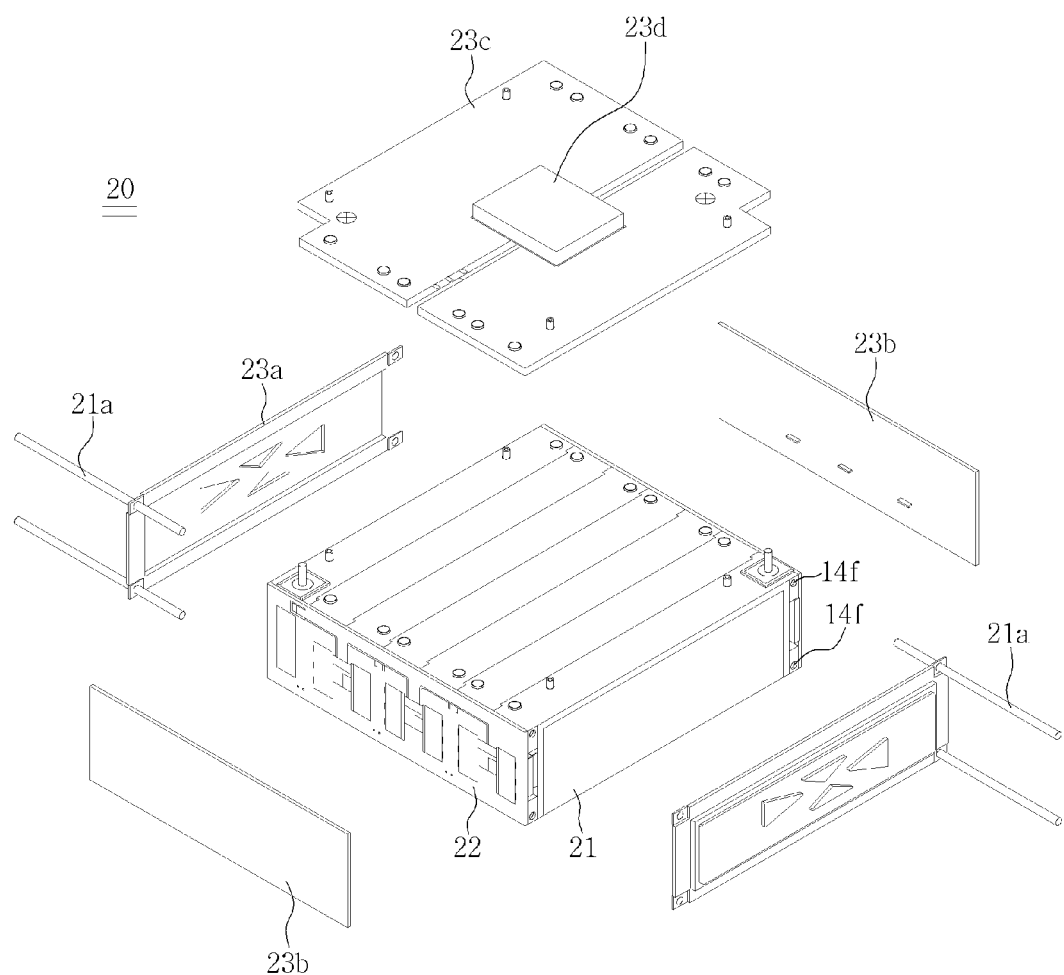
FIG. 7 is an exploded perspective view showing a coupling relationship of a cover part of battery module according to the embodiment of the present invention.

FIGS. 5a and 5b are a perspective view and a cross-sectional view showing a stack 21 of the battery module 20 according to an embodiment of the present invention, FIG. 6 is an exploded perspective view showing a coupling relationship between the stack 21 and a connecting busbar assembly 22 of the battery module 20 according to the embodiment of the present invention, and FIG. 7 is an exploded perspective view showing a coupling relationship of a cover part 23 of battery module 20 according to the embodiment of the present invention. Hereinafter, a battery module 20 in which a plurality of the submodules 10 described above are stacked will be described based on the above description, and a description overlapping with the above description will be omitted.

The battery module 20 according to the embodiment of the present invention includes: the stack 21 in which the above described submodules 10 are sequentially stacked in front and rear directions, wherein the submodules 10 are stacked in alternate directions such that a single cell 11a of first submodule 10 faces a single cell 11a of a second submodule 10, and a first cooling fin 12 of the first submodule 10 and a first cooling fin 12 of the second submodule 10 are in direct surface contact with each other; the connecting busbar assembly 22 coupled to opposite sides of the stack 21, and having an internal connecting busbar 22a provided in a direction toward the stack 21 and alternately and electrically connecting a first internal busbar 14a and a second internal busbar 14b between the submodules 10 to each other; and the cover part 23 having a module cover 23a covering front and rear surfaces of the stack 21 in a stacked direction, a busbar cover 23b covering the connecting busbar assembly 22 coupled to the opposite sides of the stack 21, and an upper cover 23c covering an upper portion of the stack 21.

As shown in FIG. 5a, the stack 21 is configured such that the submodules 10 are stacked in front and rear directions to be coupled to each other. As shown in FIG. 5b, in the stacking sequence of the plurality of submodules 10, the submodules 10 are stacked in alternate directions such that the single cell 11a of the first submodule 10 faces the single cell 11a of the second submodule 10, and the first cooling fin 12 of the first submodule 10 and the first cooling fin 12 of the second submodule 10 are in direct surface contact with each other. In other words, the single cell 11a of the first submodule 10 faces the single cell 11a of the second submodule 10, while a double cell 11b of the first submodule 10 faces a double cell 11b of the second submodule 10, thereby providing the stack 21. As the first cooling fin 12 of the first submodule 10 and the first cooling fin 12 of the second submodule 10 are in direct surface contact with each other, two first cooling fins 12 in contact with each other may have the same shape as one second cooling fin 13. Thus, each of the cells 1 composing the stack 21 can be cooled to the same level.

Meanwhile, the stack 21 may be further include an elastic absorption pad AP provided on stacked surfaces in which the double cell 11b of the first submodule 10 and the double cell 11b of the second submodule 10 are stacked to face each other, such that the elastic absorption pad AP is in surface contact with the stacked surfaces. The function and role of the elastic absorption pad AP is the same as that of the elastic absorption pad AP described above.

Further, as shown in FIG. 7, the stack 21 in which the plurality of submodules 10 are stacked may be assembled with the module cover 23a that will be described later, such that a long bolt 21a may be inserted into a through hole 14f formed at four corners of the front and rear surfaces of the stack 21 and aligned in the stacked direction. On the other hand, when the number of the submodules 10 is large and thus it is difficult to secure rigidity of the stack 21 by only the long bolt 21a, the stack 21 may be further include a reinforcing frame (not shown) at a lower side thereof.

The connecting busbar assembly 22 is configured to electrically connect the submodules 10 composing the stack 21 to each other, wherein the connecting busbar assembly 22 is coupled to opposite sides of the stack 21, and is provided with the internal connecting busbar 22a provided in the direction toward the stack 21 and alternately and electrically connecting the first internal busbar 14a and the second internal busbar 14b between the submodules 10 to each other. As the first internal busbar 14a and the second internal busbar 14b between the submodules 10 are electrically connected to each other by the connecting busbar assembly 22 coupled to the opposite sides of the stack 21, reliability of the electrical connection can be improved, and the assembly process can be simplified. The internal connecting busbar 22a and the first and second internal busbars 14a and 14b may be coupled with each other by laser welding after the connecting busbar assembly 22 is coupled to sides of the stack 21, but is not limited thereto.

The submodules 10 may be electrically connected to each other by the internal connecting busbar 22a in series or in parallel. In series connection, the first internal busbar 14a of the first submodule 10 and the second internal busbar 14b of the second submodule 10 adjacent to the first internal busbar 14a have different polarities from each other, whereby the submodules 10 can be electrically connected to each other in series.

Meanwhile, the connecting busbar assembly 22 may include a temperature sensor (not shown), a low-voltage detection bundle (not shown), and first and second external terminals 22b and 22c in addition to the internal connecting busbar 22a. The first external terminal 22b is electrically connected to the first internal busbar 14a of a first outermost submodule 10 stacked on a first outermost side of the stack 21, and is bent toward a top of a casing 14 of the submodule 10 to be exposed to the outside of the upper cover 23c that will be described later, so that the first external terminal 22b is inserted into an external terminal insertion part 14e of the casing 14. The second external terminal 22c is electrically connected to the second internal busbar 14b of a second outermost submodule 10 stacked on a second outermost side of the stack 21, and is bent toward a top of a casing 14 of the submodule 10 to be exposed to the outside of the upper cover 23c, so that second external terminal 22c is inserted into an external terminal insertion part 14e of the casing 14.

Referring to FIG. 7, the battery module 20 according to the embodiment of the present invention includes the cover part 23, wherein the cover part 23 includes the module cover 23a covering the front and rear surfaces of the stack 21 in the stacked direction, the busbar cover 23b covering the connecting busbar assembly 22 coupled to opposite sides of the stack 21, and the upper cover 23c covering the upper portion of the stack 21. As the module cover 23a covers the front and rear surfaces of the stack 21, it is possible to protect the front and rear surfaces of the stack 21 from external impacts. As the busbar cover 23b covers the connecting busbar assembly 22, it is possible to prevent foreign substances from invading into the internal connecting busbar 22a, and to prevent shorting between the internal connecting busbar 22a and the first and second internal busbars 14a and 14b. Moreover, the upper cover 23c is provided with a battery management system 23d, whereby it is possible to control overvoltage, overcurrent, and the like of the battery module 20.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Accordingly, any and all modifications, variations or equivalent arrangements should be considered to be within the scope of the invention, and the detailed scope of the invention will be disclosed by the accompanying claims.

What is claimed is:

1. A submodule for a battery module, the submodule comprising:
   a cell unit in which cells each including a cell body and first and second battery tabs protrudingly extending from the cell body are stacked in one direction, the cell unit being divided into a single cell that comprises one cell and a double cell that comprises two cells and is stacked in a first surface of the single cell, wherein the first surface of the single cell faces one surface of the double cell;
   a first cooling fin including a single cell heat transfer part being provided a second surface of the single cell facing the first surface of the single cell and being in surface contact with the second surface of the single cell, and a single cell heat dissipation part located at a lower side of the cell unit and extending from a lower end of the single cell heat transfer part to be bent in a thickness direction of the single cell provided at a side of the single cell heat transfer part; and
   a second cooling fin including a double cell heat transfer part being provided between the two cells composing the double cell and being in surface contact with stacked surfaces of the two cells, and a double cell heat dissipation part located at a lower side of the cell unit and extending from a lower end of the double cell heat transfer part in thickness directions of the two cells provided at opposite sides of the double cell heat transfer part,
   wherein the single cell heat dissipation part and the double cell dissipation part are formed on the same surface and only located at a lower side of the cell unit.

2. The submodule of claim 1, wherein the cell unit includes a plurality of double cells that are stacked sequentially in the direction opposite to the one surface of the single cell.

3. The submodule of claim 1, wherein the cell unit further includes an elastic absorption pad that is provided between the single cell and the double cell and is in surface contact with stacked surfaces of the single cell and the double cell.

4. The submodule of claim 2, wherein the cell unit further includes an elastic absorption pad that is provided between the double cells and is in surface contact with stacked surfaces of the double cells.

5. The submodule of claim 1, wherein an area of the single cell heat dissipation part corresponds to a cross-sectional area of the single cell, provided at the side of the single cell heat transfer part, in a thickness direction, and
   an area of the double cell heat dissipation part corresponds to cross-sectional areas of the two cells, provided at the opposite sides of the double cell heat transfer part, in a thickness direction.

6. The submodule of claim 5, wherein the area of the single cell heat dissipation part corresponding to the cross-sectional area of the single cell in the thickness direction is substantially the same as the area of the double cell heat dissipation part corresponding to the cross-sectional area of one of the two cells in the thickness direction.

7. The submodule of claim 1, wherein the single cell heat transfer part is provided with a thermal pad at a surface thereof, or the double cell heat transfer part is provided with a thermal pad at each of opposite surfaces thereof, such that the thermal pad is in surface contact with the single cell or the two cells, the thermal pad having higher thermal conductivity than the single cell heat transfer part or the double cell heat transfer part.

8. The submodule of claim 1, further comprising:
   a casing open at front and rear sides thereof, having the cell unit therein, and provided at opposite outer surfaces thereof with a tab coupling part to which first and second internal busbars are coupled such that the first and second internal busbars are electrically connected to the first and second battery tabs of the cell unit contained in the casing,
   wherein the single cell heat dissipation part and the double cell heat dissipation part are provided at a lower portion of the casing and are exposed to an outside of the casing.

9. The submodule of claim 8, wherein the first battery tabs of the single cell and the double cell have the same polarity, and are tightly coupled to the first internal busbar coupled to a first side of the casing, and
   the second battery tabs of the single cell and the double cell have the same polarity different from that of the first battery tabs, and are tightly coupled to the second internal busbar coupled to a second side of the casing.

10. A battery module, comprising:
    a stack in which a plurality of submodules according to claim 8 are stacked in front and rear directions in submodule-unit, wherein a first internal busbar of one submodule is disposed to a second internal busbar of adjacent submodules in alternate directions;
    a connecting busbar assembly coupled to opposite sides of the stack, and having an internal connecting busbar provided in a direction toward the stack thickness and alternately and electrically connecting a first internal busbar and a second internal busbar between the submodules to each other; and
    a cover part having a module cover covering front and rear surfaces of the stack, a busbar cover covering the connecting busbar assembly coupled to the opposite sides of the stack, and an upper cover covering an upper portion of the stack.

11. The battery module of claim 10, wherein the stack further includes an elastic absorption pad provided between a double cell of the first submodule and a double cell of the second submodule stacked to face the double cell of the first submodule, such that the absorption pad is in surface contact with the double cells of the first and second submodules.

12. The battery module of claim 10, wherein the first internal busbar of the first submodule and the second internal busbar of the second submodule that are electrically connected to each other by the internal connecting busbar have different polarities from each other, such that the plurality of submodules are connected to each other in series.

13. The battery module of claim 10, wherein the connecting busbar assembly further includes:
    a first external terminal electrically connected to the first internal busbar of a first outermost submodule stacked at a first outermost side of the stack, and bent toward a top of a casing of the first submodule such that the first external terminal is exposed to an outside of the upper cover; and a second external terminal electrically connected to the second internal busbar of a second outermost submodule stacked at a second outermost side of the stack, and bent toward a top of a casing of the second submodule such that the second external terminal is exposed to the outside of the upper cover.

* * * * *